United States Patent [19]
Whitwell

[11] 3,771,886
[45] Nov. 13, 1973

[54] NIPPLE-ELECTRODE ASSEMBLY AND JOINT

[75] Inventor: James H. Whitwell, Lockport, N.Y.

[73] Assignee: Great Lakes Carbon Corporation, New York, N.Y.

[22] Filed: Aug. 30, 1971

[21] Appl. No.: 176,013

[52] U.S. Cl. .................. 403/296, 13/18, 174/94 R, 403/343
[51] Int. Cl. ............................................. F16b 7/18
[58] Field of Search ................ 287/127 E, 20.92 E, 287/127 R, 20.92 B; 174/94 R; 13/18; 151/21 C, 14

[56] References Cited
UNITED STATES PATENTS
| | | | |
|---|---|---|---|
| 2,976,069 | 3/1961 | Meredith | 287/20.92 E |
| 3,048,433 | 8/1962 | Doetsch | 287/127 E |
| 3,517,957 | 6/1970 | Vail et al. | 287/127 E |

Primary Examiner—David J. Williamowsky
Assistant Examiner—Wayne L. Shedd
Attorney—Wallace F. Neyerlin

[57] ABSTRACT

The invention relates to nipple-electrode pre-assemblies and joints, such as those used on electric furnaces, and to a method of distributing thread clearance throughout the preassembly and/or joint. This method includes: the providing of at least one lengthwise hole between each end of the nipple, said hole being substantially axial or parallel to the axis and internally threaded for at least a portion of its length; the pre-positioning of the nipple in the socket of the electrode section into which the nipple is threaded so as to provide a clearance between the non-load bearing flanks of the nipple threads and said threaded electrode socket; and the insertion within one end of the lengthwise hole and the space between the base of the nipple and the bottom of the socket of the electrode section of a mechanical adjusting member having external threads which correspond to the internal threads of the lengthwise hole, which member by adjustment with a suitable tool inserted into the hole of the projecting end of the nipple and by turning within the threaded lengthwise hole, thereby causes or is capable of causing relative axial movement of the nipple with respect to the electrode section so as to bring or keep the load bearing flanks of the nipple threads and the electrode socket section threads into contact securing the nipple in this position. This thus provides and/or maintains the aforedescribed pre-positioning and thread clearance and thereby also provides room for any excessive diametrical expansion of the nipple over that of the electrode socket when the assembly is heated during service.

3 Claims, 7 Drawing Figures

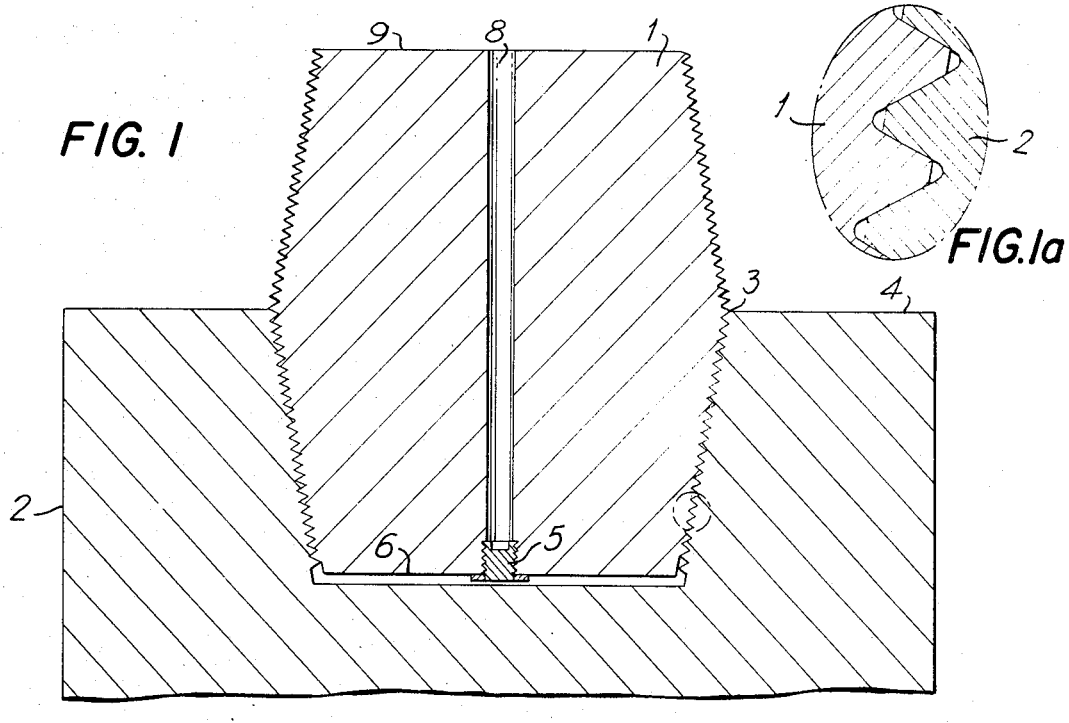
FIG. 1
FIG. 1a
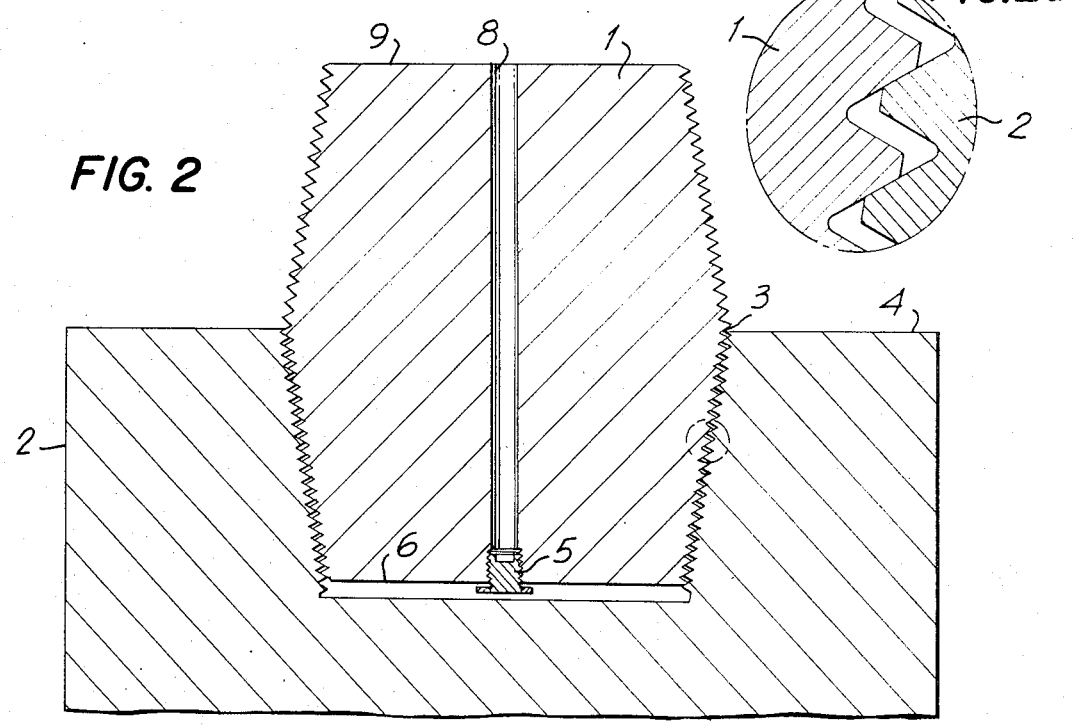
FIG. 2
FIG. 2a
INVENTOR.
JAMES H. WHITWELL

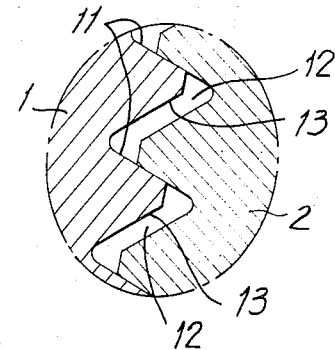
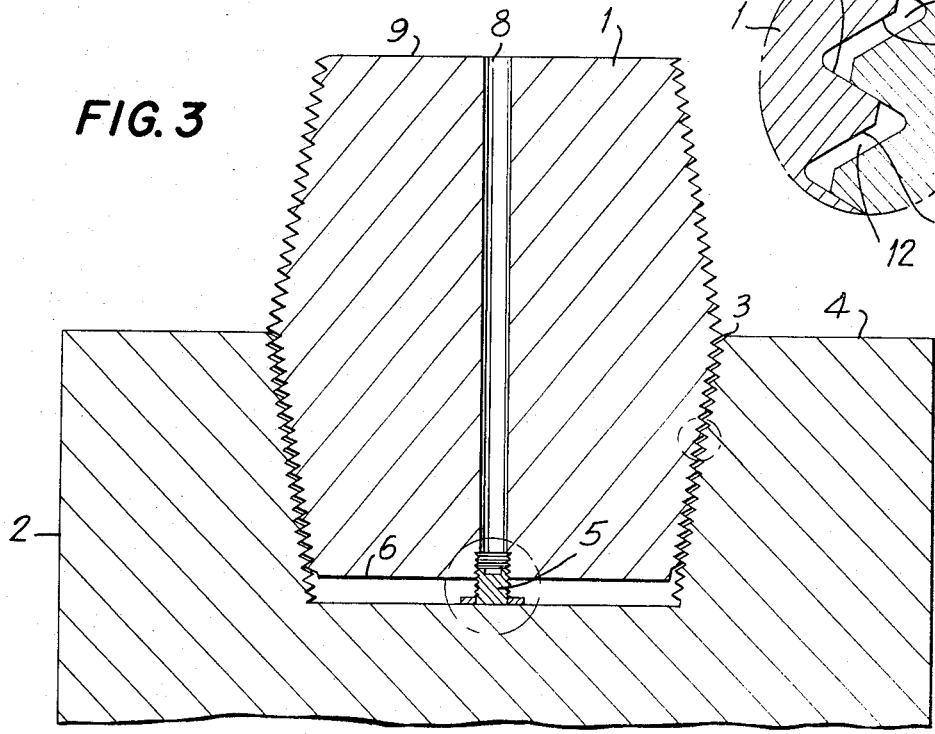
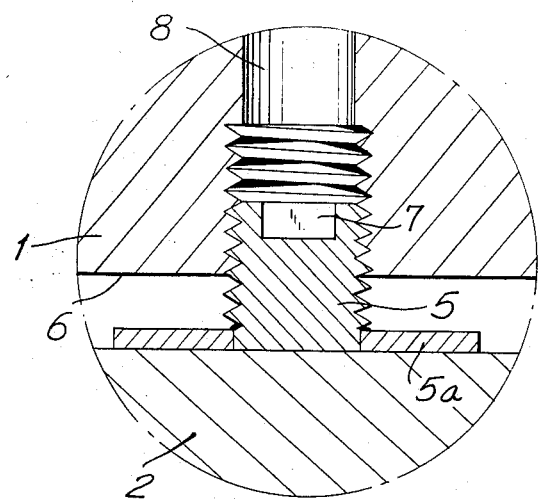

NIPPLE-ELECTRODE ASSEMBLY AND JOINT

BACKGROUND OF THE INVENTION

1. Field of the Invention

This invention relates to the field of graphite or other carbon electrodes for electric furnaces and like equipment, wherein the electrodes are consumed in use and must be continually fed into the furnace or other equipment where they are used.

It particularly relates to electrode joints that comprise a double-frusto-conical threaded connecting nipple of electrode material whose two frusto-conically tapering portions are in threaded engagement with respective frusto-conical cup-shaped socket recesses in the butt faces of the coaxially aligned electrodes and to the manner in which such a joint is assembled. However, the threaded nipples and their corresponding sockets or bore holes in the electrode sections may also have threaded sides which are parallel to the nipple axis. Such joints serve to add a new electrode to the end of a nearly consumed electrode to permit a continuous furnace operation by replenishing the electrode material in accordance with the rate of consumption.

In making such joints, one end of the nipple is screwed into place in a corresponding bore or socket of one of the electrodes to the approximate middle of the nipple and then the other electrode section is threaded to the other end of the nipple until the faces of the electrode sections are in contact. With a tapered nipple, its largest diameter is at its middle and is also at the plane of contact between the electrode sections. The threaded depth of the nipples is generally the same whether measured at the ends of the nipple or at its center and this is true whether the nipple is straight or tapered. It is also usual, with either type of connecting nipple, that in the assembled joint each thread will possess a loaded flank, which is nearer the geometric center of the nipple, and a non-load bearing or idle flank which is opposite to the loaded flank. (That is, the idle flank is the flank nearer the ends of the nipple and the loaded flank is the flank nearer the geometric center of the nipple, and this is how these flanks are defined in the present invention). The loaded flank generally carries most, if not all, of the compressive stress between the nipple and the electrode sections.

In this type of joint, the half that is assembled first usually contains little or no clearance at the idle flank while maximum clearance occurs at the idle flank of the second half assembled.

Such electrode joints are generally mechanically weaker than the full-bodied portions of the electrodes. To maintain the strength of the joint as high as possible the nipple is normally produced from higher strength graphite than the electrode itself. In processsing the nipple to higher strength the coefficient of thermal expansion (CTE) of the ultimate graphite nipple is also normally increased as compared to the graphite of the electrode stock. This higher coefficient of thermal expansion of the nipple relative to the electrode socket leads to thermal stresses within the joint during service on a furnace. Consequently the joints are particularly susceptible to breaking because of these thermal stresses which occur during heating and/or cooling of the electrodes. The high current loading of the electrode on modern electric arc furnaces frequently causes additional joint stresses by overheating of the nipple portion at the junction places between the nipple and the electrode sockets. All such thermal stresses are particularly critical with electrodes of large diameters, especially in electric arc furnaces operating at very high power levels as are used for increasing furnace productivity.

2. Description of the Prior Art

There has been a well recognized need to more evenly distribute the aforedescribed clearance differences in order to reduce or counteract thermal stresses which build up due to lack of clearance to permit accommodation of the thermal expansion of the nipple and result in failure of the joint. Various methods have been proposed by those skilled in the art to accomplish substantially even distribution of thread clearance. For example, this problem and several proposed solutions for same are discussed in U. S. Pat. Nos. 2,957,716; 2,970,854; 3,088,762; 3,134,616; 3,140,967; 3,517,954; 3,517,957; and 3,550,270; and also in German Pat. Nos. 1,091,253 and 1,100,838. The present invention also relates to and is concerned with a more even distribution of clearance between the threads of the nipple and the electrode sockets and consequent reduction in thermal stresses between a nipple and the electrode sections into which it is threaded and offers a novel and advantageous approach for accomplishing this.

SUMMARY OF THE INVENTION

It is an object of the present invention to provide a nipple-electrode section pre-assembly in which there is a more evenly distributed clearance (as compared to conventional commercial practices) between the idle or non-load bearing flanks of the nipple threads and the threads of the electrode section socket, so as to provide room for thermal expansion of said threads and to thereby minimize the aforedescribed thermal stress conditions and to reduce the problems created by these conditions.

It is another object of this invention to substantially evenly distribute thread clearance throughout a nipple-electrode section pre-assembly, and also throughout an entire electrode joint assembly comprising two electrode sections having threaded sockets in the ends thereof and a nipple threaded into said sockets, joining the electrode sections together.

It is another object of this invention to accomplish the aforesaid more even distribution of thread clearance in an advantageous and practical manner which is also novel as compared to techniques which have been suggested or taught by the prior art for solving this problem.

The invention comprises the making of an improved nipple-electrode section pre-assembly, such as just discussed, for use in an electrode joint comprised of said pre-assembly and a second electrode section, said nipple being threaded and said sections possessing correspondingly threaded internal sockets extending inwardly from their end faces, by:

a. Providing at least one lengthwise hole between each end of the nipple, said lengthwise hole being substantially axial or parallel to the axis and internally threaded for at least a portion of its length;

b. inserting a mechanical adjusting member, having external threads which correspond to the internal threads of the lengthwise hole, into a threaded end of the lengthwise hole, said member being capable of being adjusted from the other end of the hole and to cause, or be capable of causing, relative axial movement between the nipple and the electrode section of the pre-assembly;

c. threading the end of the threaded nipple containing the mechanical adjusting member into the internally threaded socket of the pre-assembly electrode section to such a degree and in such a manner that by adjustment of the mechanical member it is possible to provide or maintain a clearance between the non-load bearing flanks of the threads of said nipple and of said threaded electrode socket, the other end of said threaded nipple projecting outwardly form said socket; and d. adjusting the mechanical member by inserting a suitable tool into the hole of the projecting end of the nipple and by turning the threaded mechanical member within the threaded lengthwise hole so as to bring or keep the load bearing flanks of the nipple and the electrode socket section into contact securing the nipple in this position, thus providing said clearance between the non-load bearing flanks of the nipple threads and of said threaded electrode socket.

This pre-assembly is adapted to be added to a second electrode section to complete the making of the electrode joint by threading the projecting end of the nipple into said second electrode section thereby also providing substantially even distribution of clearance between the threads of said nipple and the threads of the sockets of the electrode sections in the making of the final joint assembly.

As aforesaid, the mechanical member is adjusted by inserting a suitable tool into and/or down through the hole of the projecting end of the nipple, mechanically engaging the top of said member, and by turning said member within the hole. Typically the top of the mechanical adjusting member will possess a slot or recess of suitable size and shape for engagement by means of a suitable tool such as a screwdriver or an Allen wrench of proper length. By turning the mechanically engaged tool or wrench at the projecting or exposed end of the nipple, the externally threaded adjusting member is turned within the internally threaded lengthwise hole in the nipple, causing the member to contact the socket base and in turn cause or be capable of causing relative axial movement of the nipple with respect to the electrode section. The turning of the adjusting member is continued until the load-bearing flanks of the nipple threads come or are caused to be kept in contact with the adjacent or mating flanks of the threads of the electrode socket thus securing the nipple in this position and thus also providing the desired clearance between the non-load bearing flanks of the threads of said nipple and of said threaded electrode socket. The suitable tool employed to turn the inner element is then, of course, removed from the lengthwise hole of the thus "secured" or "fixedly pre-positioned" nipple in the electrode section. The pre-assembly is thus adapted to be added to a second electrode section to complete the making of the electrode joint by threading the projecting end of the nipple into said second electrode section and to thereby also provide substantially even distribution of clearance between the threads of said nipple and the threads of the sockets of the electrode sections in the making of the final joint assembly.

The invention embraces not only the method of making the pre-assembly but also the nipple-electrode-section pre-assembly itself, the method and connection improvements involved, and an electrode joint assembly made by coupling a second electrode section to the improved nipple-electrode section pre-assembly.

Other objects, and coincident advantages, and a complete understanding of the invention will be apparent to those skilled in the art after a study of the drawings, and a reading of the specification and claims.

BRIEF DESCRIPTION OF THE DRAWINGS

It has been found that the foregoing objects are achieved by making the nipple-electrode section pre-assembly illustrated in vertical cross-section in FIG. 3 and by using this preassembly as a part of each joint assembly used in the electrode train. FIGS. 1 and 2 illustrate a pre-assembly of the same members as shown in FIG. 3 but with the members and thread flank arrangements in initial stages or positions before the final desired positioning of the members and thread clearance of FIG. 3 is obtained. FIGS. 1a, 2a and 3a show expanded detail of the elliptical or encircled portions of the threads and thread flanks of the nipple, electrode-section arrangements of FIGS. 1, 2 and 3, respectively. FIG. 4 is an expanded cross-sectional view of the lower circled portion of FIG. 3 and illustrates a typical threaded mechanical adjusting member and threaded longitudinal hole which are used in carrying out the process of or in making the pre-assembly of the present invention.

DETAILED DESCRIPTION OF THE DRAWINGS AND OF THE PREFERRED EMBODIMENTS

In FIG. 1, the nipple 1, which as previously stated is preferably tapered, was threaded into a correspondingly threaded socket of electrode section 2. Before this was done, the nipple was provided with a lengthwise axial hole 8 between its ends 6 and 9, which hole was internally threaded for at least a portion of its length and into which the threaded mechanical adjusting member 5 was inserted. In the particular embodiment being described, the nipple had a major diameter of 10 ¾ inches, the diameter of the longitudinal hole was 1 ⅛ inches and the diameter of the electrode section was 20 inches. The nipple also had a one-third pitch, i.e., three threads per inch, and a taper of 1 to 6, i.e., its radius decreased by 1 inch for every 6 inches of length of the nipple away from the maximum diameter. The end of the nipple containing the mechanical adjusting member was threaded into the socket until its major diameter, indicated generally at 3, coincided approximately with the plane of the face 4 of the electrode section and until it was "hand-tight," i.e., until the threads of both the nipple and electrode socket section were fully or completely engaged, i.e., the threads were in contact on both flanks, as illustrated in FIG. 1a. In FIG. 2 the nipple was "backed-off" a calculated slight amount such as an eighth turn (i.e., 45°), thus bringing about the loosely engaged thread flank relationship illustrated in FIG. 2a. (It should be noted that in these stages of making the pre-assembly the adjusting member 5 is positioned in such a manner in nipple hole 8 that it does not touch the bottom of the socket of the electrode section). This "backing off" of the nipple makes it possible to "pre-position" the nipple in the electrode section socket in the next step of the process and to thus provide the desired clearance between the idle flanks of the threads of said threaded nipple and said threaded electrode socket, as illustrated and described in more detail by reference to FIGS. 3, 3a and 4.

The backing-off of 45° of the nipple in the embodiment just described is satisfactory for a nipple having a pitch and taper as set forth. In a more general sense, the number of degrees backed-off will depend on the pitch and taper of the nipple because the clearance between the threads is a function of these two variables. For standard nipples having a one-third pitch and a taper of 1 to 6, the number of degrees backed off will typically be a value from about 45° to about 90°; for standard nipples having a one-fourth pitch (4 threads per inch) and a taper of 1 to 6, the number of degrees backed off will typically be a value from about 60° to about 135°.

The mechanical adjusting member 5, shown in detail in FIG. 4, was then adjusted with a suitable tool inserted down through the hole 8 to cause the bottom of said member to push against the base of the socket of the electrode section 2, to thus cause relative axial movement between the nipple 1 and the electrode section 2 so as to provide the desired thread clearance or thread flank arrangement illustrated in FIG. 3a, and to cause a slightly increased gap or space between the base of the nipple and the electrode section socket bottom (illustrated exaggeratedly in FIGS. 3 and 4 as compared to FIG. 1 and/or FIG. 2). This pre-positioning of the nipple caused the upper faces or load-bearing flank 11 of the nipple (viz., the flank nearer the geometric center of the nipple) to contact the mating faces of the threads of the socket and also caused or created a slight gap or clearance 12 at the idle or non-load bearing flank or side 13 of the thread, viz., the flank nearer the end 6 of the nipple.

As shown in FIG. 4, the mechanical adjusting member 5 is of proper diameter and external thread design so as to be capable of threaded engagement within the internally threaded lengthwise hole to thereby provide for its axial adjustability within said hole and to thereby also cause (and/or maintain) the aforesaid relative axial movement of the nipple with respect to the electrode section. It should be noted that the relative axial movement or positioning of the nipple with respect to the electrode section may be caused in other ways than by use of member 5 alone, such as by use of a ring 1 as described in U. S. Pat. No. 3,550,270, or a "centering jig" as described in U. S. Pat. No. 3,517,954. If such alternatives are used, then the mechanical adjusting member is employed more to maintain and/or keep the desired thread clearance rather than to also establish or provide same.

The threading of the adjustable spacing means is preferably opposite to the external threading of the nipple containing same. For example, the nipple normally possesses a right-hand thread and in such case the adjusting member and the hole in the nipple are preferably provided with matching left-handed threads so as to resist further turning of the adjusting member after completion of the pre-assembly and when threading a second electrode section onto the other projecting end of the nipple. Adjusting member 5 possesses a keying means 7, such as a slot or a cornered recess therein, so that it may be turned by means of a suitable tool, such as a screwdriver or Allen wrench, inserted down or through hole 8 and turned therein. Regardless of whether it is employed alone or with an alternative such as the aforediscussed ring or centering jig, in the final positioning of the nipple in the pre-assembly, member 5 is always adjusted within hole 8 until the nipple is fixed or secured firmly in place in the electrode section socket, with the load bearing thread flanks in contact, and with clearance between the non-load bearing flanks as shown in FIG. 3a.

Mechanical member 5 may be provided with a flange 5a at its base so as to provide more balanced lifting or sustaining of the nipple in its raised position illustrated in FIG. 3a. It should also be appreciated that more than one hole 8 and mechanical adjusting member 5 may be employed in carrying out the invention, although this is not generally necessary or desirable. Any such hole or holes used should be substantially axial and/or parallel to the nipple axis so as to assure even balancing of the nipple in the socket of the pre-assembly electrode section and thus guard against "cocking" of the nipple therein.

As shown in FIG. 4, the hole 8 is internally threaded for only a portion of its length and at one end thereof. The hole, of course, may be threaded in several ways. For example, it may be threaded its entire length so as to facilitate the insertion of the mechanical adjusting member 5 from either end of the nipple; or the hole 8 may be unthreaded for a short distance from the end of the nipple and of larger diameter than the threaded portion, so as to facilitate easy entry and threaded engagement of the adjusting member therein.

When an electrode-nipple pre-assembly as described herein is added to a second electrode section of an electric furnace column or train, the nipple in the resulting 3-membered joint (viz. two electrode sections with the nipple half-threaded into each) will be so located that there will be a substantially even distribution of clearance between the idle flanks of the threads of both halves of the nipple in the electrode section sockets of the final joint asembly, rather than the common and objectionable condition typically encountered in the prior art of no clearance at the idle flank of the threads of the nipple-half assembled first and maximum clearance at the idle flank of the threads of the second nipple-half assembled. Consequently there is a reduction in the thermal stresses between the nipple and the electrode sections into which it is threaded with the result that there is a reduction in the degree of splitting and breakage of the joint in furnace operation.

The net effect, therefore, of centering or balancing the nipple in the joint, is that there are fewer mechanical breakdowns or failures in the operation of the furnace. There are also other advantages inherent in making the nipple-electrode section assemblies and joints in accordance with the present invention. For example, the incidence of thread stripping from the sockets of the threaded electrode sections is virtually precluded because of the more uniform thread loading attending the centering of the nipple.

It is to be understood that the invention is not limited to the specific details which have been offered merely for illustrative purposes and that modifications may be made within the scope of the appended claims without departing from the spirit of the invention.

I claim:

1. An electrode section nipple assembly comprising:
   a. A cylindrical electrode section containing internally threaded sockets extending into the section from each of its end faces;

b. a threaded nipple, having at least one lengthwise hole therein which is substantially axial or parallel to the axis of the nipple, threaded into and positioned in one of the sockets of said electrode section with the load bearing flanks of the nipple threads, which are the flanks nearer to the geometric center than to the ends of the nipple in contact with the mating faces of the threads of the electrode section socket and with a space between the base of the nipple and the bottom of the electrode section socket; and c. a mechanically adjustable spacing member situated within the lengthwise hole of the nipple and the space between the base of the nipple and the bottom of the socket of the electrode section which is adjustable through the opposite end of the hole in the nipple to hold the load bearing flanks of the nipple threads and the electrode socket section threads in contact thereby securing the nipple in this position in the electrode section socket, and thus also providing a clearance between the non-load bearing flanks of the nipple threads and said threaded electrode socket;

said lengthwise hole being internally threaded for at least a portion of its length and said spacing member being correspondingly externally threaded thereby providing for its adjustability within said hole.

2. An electrode section nipple assembly according to claim 1 wherein the threading of the adjustable spacing member is opposite to the external threading of the nipple containing same.

3. In an electrode joint comprising two electrode sections containing internally threaded sockets which extend inwardly from end faces of said sections and a threaded nipple connecting said sections by being threaded into said sockets, the improvement wherein the joint includes the assembly of claim 1.

* * * * *